(12) United States Patent
Shinozaki et al.

(10) Patent No.: US 11,101,758 B2
(45) Date of Patent: Aug. 24, 2021

(54) MOTOR CONTROL DEVICE AND MOTOR CONTROL METHOD

(71) Applicant: Hitachi Astemo, Ltd., Hitachinaka (JP)

(72) Inventors: Yuya Shinozaki, Isesaki (JP); Masaki Hano, Isesaki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/969,447

(22) PCT Filed: Sep. 19, 2018

(86) PCT No.: PCT/JP2018/034621
§ 371 (c)(1),
(2) Date: Aug. 12, 2020

(87) PCT Pub. No.: WO2019/159412
PCT Pub. Date: Aug. 22, 2019

(65) Prior Publication Data
US 2020/0373865 A1 Nov. 26, 2020

(30) Foreign Application Priority Data
Feb. 13, 2018 (JP) .............................. JP2018-023472

(51) Int. Cl.
*H02P 6/00* (2016.01)
*H02P 21/22* (2016.01)
*F02D 15/02* (2006.01)

(52) U.S. Cl.
CPC .............. *H02P 21/22* (2016.02); *F02D 15/02* (2013.01)

(58) Field of Classification Search
CPC ........... H02P 21/22; H02P 23/009; H02P 6/06
See application file for complete search history.

(56) References Cited

U.S. PATENT DOCUMENTS

2012/0081054 A1* 4/2012 Hisada .................... H02P 25/24
318/400.41

FOREIGN PATENT DOCUMENTS

JP 2006-42562 A 2/2006
JP 2008-184057 A 8/2008
(Continued)

OTHER PUBLICATIONS

International Preliminary Report on Patentability (PCT/IB/338 & PCT/IB/373) issued in PCT Application No. PCT/JP2018/034621 dated Aug. 27, 2020, including English translation (Japanese-language Written Opinion (PCT/ISA/237) previously filed on Aug. 12, 2020) (six (6) pages).

(Continued)

*Primary Examiner* — Karen Masih
(74) *Attorney, Agent, or Firm* — Crowell & Moring LLP

(57) ABSTRACT

A motor control device drives a motor provided as a drive source of an electric actuator by performing vector control using d-q rotational coordinates, and sets a d-axis current command value so as to weaken field flux of the motor when torque is applied to the motor from the exterior in a direction that is the same as a rotation direction of the motor. When the rotational speed of the motor exceeds the predetermined upper rotational speed limit, the motor control device calculates a correction amount of the d-axis current command value so as to make a rotational speed of the motor converge to a predetermined upper rotational speed limit, and corrects the d-axis current command value by this correction amount.

10 Claims, 11 Drawing Sheets

(56) References Cited

FOREIGN PATENT DOCUMENTS

| | | |
|---|---|---|
| JP | 2010-241165 A | 10/2010 |
| JP | 2016-63642 A | 4/2016 |

OTHER PUBLICATIONS

International Search Report (PCT/ISA/210) issued in PCT Application No. PCT/JP2018/034621 dated Dec. 25, 2018 with English translation (two (2) pages).

Japanese-language Written Opinion (PCT/ISA/237) issued in PCT Application No. PCT/JP2018/034621 dated Dec. 25, 2018 (three (3) pages).

* cited by examiner

FIG. 4

| ANGULAR DEVIATION [deg] | | TARGET ROTATIONAL SPEED [rpm] | | | | | | | | PREDETERMINED ROTATIONAL SPEED N₀ |
|---|---|---|---|---|---|---|---|---|---|---|
| | | 5000 | 4900 | ... | 2100 | 2000 | 1900 | ... | INCREASE COMPRESSION RATIO | |
| | | | | | | | | | -3400 | -5000 |
| DECREASE COMPRESSION RATIO | 70 | -5.6 | -5.5 | ... | -2.7 | -2.6 | 0 | ... | 0 | 0 |
| | 65 | -5.4 | -5.3 | ... | -2.5 | -2.4 | 0 | ... | 0 | 0 |
| | ... | ... | ... | ... | ... | ... | ... | ... | ... | ... |
| | 15 | -3.8 | -3.7 | ... | -0.9 | -0.8 | 0 | ... | 0 | 0 |
| | 10 | -3.6 | -3.5 | ... | -0.7 | -0.6 | 0 | ... | 0 | 0 |
| | 5 | 0 | 0 | ... | 0 | 0 | 0 | ... | 0 | 0 |
| INCREASE COMPRESSION RATIO | -5 | | | | | | | | | |
| | ... | | | | | | | | | |
| | -70 | | | | | | | | | |

DECREASE COMPRESSION RATIO / INCREASE COMPRESSION RATIO

PREDETERMINED DEVIATION D₀

FLUX WEAKENING CONTROL EXECUTION RANGE

COMPRESSION RATIO DECREASING RANGE

MOTOR CONTROL DEVICE AND MOTOR CONTROL METHOD

TECHNICAL FIELD

The present invention relates to motor control devices and to motor control methods.

BACKGROUND ART

When driving a motor provided as a drive source of an electric actuator for changing a setting state of a vehicle device, such as the top dead center position of a piston set by, for example, a variable compression ratio mechanism, there is a case in which setting operation of the vehicle device is required to have high responsiveness. In such a case, it is known to perform so-called "flux weakening control" in order to increase the motor rotational speed more than usual. In the flux weakening control, current is applied to generate magnetic flux in an armature coil to thereby weaken the field flux of the motor. (See, for example, Patent Document 1.)

REFERENCE DOCUMENT LIST

Patent Document

Patent Document 1: JP 2008-184057 A

SUMMARY OF THE INVENTION

Problem to be Solved by the Invention

A predetermined upper rotational speed limit of a motor rotational speed may be set from various viewpoints. For example, an upper rotational speed limit of a motor rotational speed may be set in order to ensure effectiveness of a fail-safe measure when an on-board system fails. In this example, the upper rotational speed limit is set based on a safety measure period that is a time period required for the fail-safe measure, and an allowable deviation amount that is an allowable value for a deviation amount from a target position of a movable part in the on-board system.

However, due to characteristics of the on-board system, if torque is applied from the movable part to the motor in the same direction as the rotation direction of the motor, there is concern that the flux weakening control may cause a rapid increase in rotational speed of the motor, so that the rotational speed exceeds and deviates from the predetermined upper rotational speed limit.

The present invention has been made in view of these problems, and an object of the present invention is to provide a motor control device and a motor control method that prevent a motor rotational speed from exceeding and deviating from a predetermined upper rotational speed limit during flux weakening control of the motor.

Means for Solving the Problem

According to an aspect of the present invention, a motor control device includes a controller that drives a motor provided as a drive source of an electric actuator by performing vector control using d-q rotational coordinates, and that sets a d-axis current command value so as to weaken field flux of the motor when torque is applied to the motor from the exterior in a direction that is the same as a rotation direction of the motor. The controller corrects the d-axis current command value so as to make a rotational speed of the motor converge to a predetermined upper rotational speed limit when the rotational speed of the motor exceeds the predetermined upper rotational speed limit.

According to another aspect of the present invention, a motor control method includes the steps of: driving a motor provided as a drive source of an electric actuator by performing vector control using d-q rotational coordinates; and setting a d-axis current command value so as to weaken field flux of the motor when torque is applied to the motor from the exterior in a direction that is the same as a rotation direction of the motor. The method further includes the step of correcting the d-axis current command value so as to make a rotational speed of the motor converge to a predetermined upper rotational speed limit when the rotational speed of the motor exceeds the predetermined upper rotational speed limit.

Effects of the Invention

According to the motor control device and the motor control method of the present invention, it is possible to prevent the motor rotational speed from exceeding and deviating from the predetermined upper rotational speed limit during flux weakening control of the motor.

BRIEF DESCRIPTION OF THE DRAWINGS

FIG. 4 is a table illustrating an example of a map for setting a flux weakening amount.

MODE FOR CARRYING OUT THE INVENTION

Hereinbelow, embodiments of the present invention will be described in detail with reference to the accompanying drawings.

First Embodiment

Figure 1:
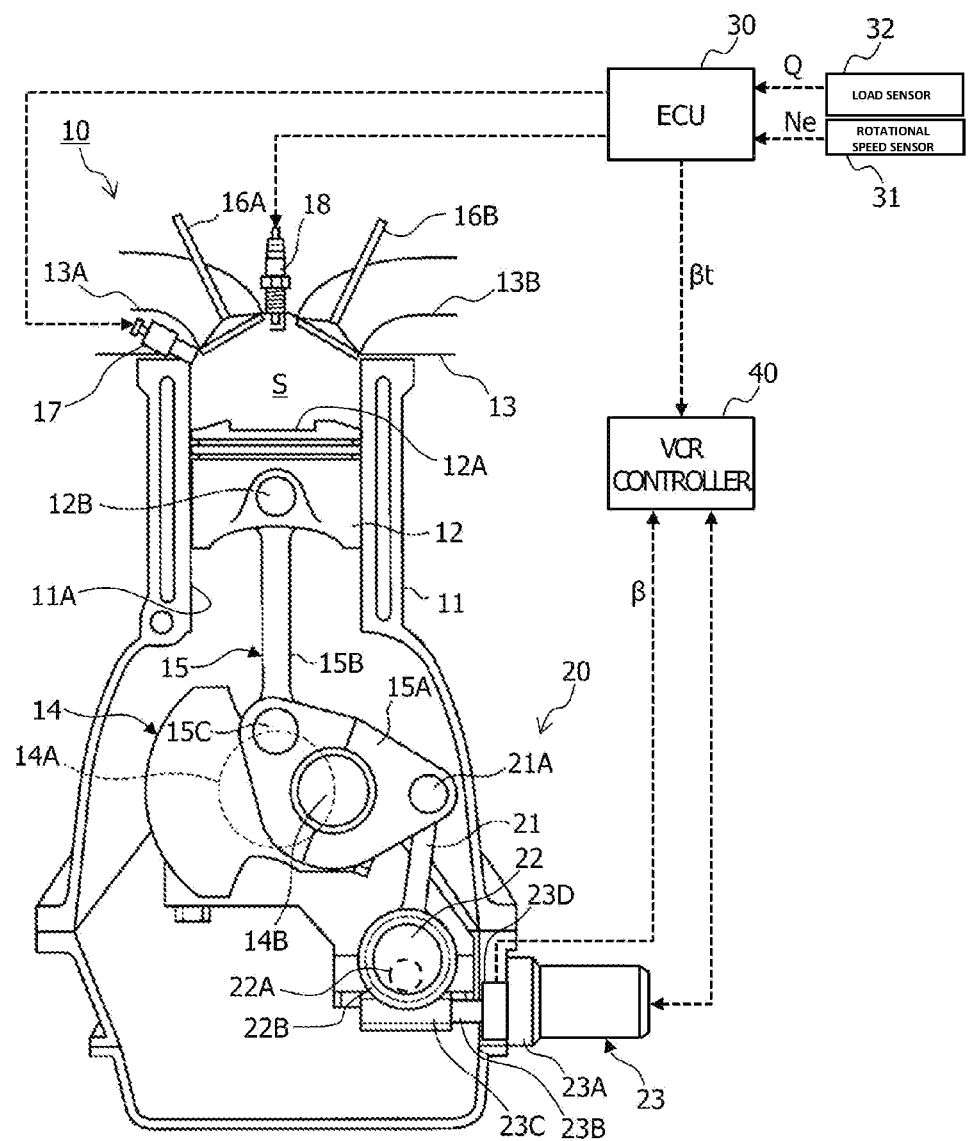
FIG. 1 is a configuration view illustrating an example of an internal combustion engine for a vehicle, for which a motor control device is used.

FIG. 1 illustrates an example of an internal combustion engine for a vehicle, for which a motor control device is used.

An internal combustion engine 10 includes a cylinder block 11, a piston 12 inserted in a cylinder bore 11A of cylinder block 11 in a manner capable of reciprocating movement, and a cylinder head 13 having an intake port 13A and an exhaust port 13B.

Piston 12 is connected to a crankshaft 14 via a connecting rod 15 including a lower link 15A and an upper link 15B. A combustion chamber S is formed between a crown surface 12A of piston 12 and a lower surface of cylinder head 13.

Cylinder head 13 is provided with an intake valve 16A that opens and closes an open end of intake port 13A, which faces combustion chamber S, and an exhaust valve 16B that opens and closes an open end of exhaust port 13B, which faces combustion chamber S. Furthermore, to cylinder head 13, there are mounted a fuel injection valve 17 for injecting fuel, and an ignition plug 18 for igniting a mixture of fuel and air, at positions which face combustion chamber S.

Crankshaft 14 includes multiple journal portions 14A and multiple crank pin portions 14B. Journal portions 14A are rotatably supported by main bearings (not shown) of cylinder block 11. Crank pin portions 14B are eccentric to journal portions 14A, and lower link 15A is rotatably coupled to each of crank pin portions 14B. Upper link 15B has a lower end rotatably coupled to one end of lower link 15A by a coupling pin 15C, and has an upper end rotatably coupled to piston 12 by a piston pin 12B.

Internal combustion engine 10 includes a variable compression ratio (VCR) mechanism 20 that makes the compression ratio variable by changing the volume of combustion chamber S. VCR mechanism 20 makes the volume of combustion chamber S change by means of, for example, a multi-link mechanism as disclosed in JP 2002-276446 A.

VCR mechanism 20 includes a control link 21, a control shaft 22, and an electric actuator 23. Control link 21 has an upper end rotatably coupled to the other end of lower link 15A by a coupling pin 21A, and a lower end swingably coupled to a lower portion of cylinder block 11 via control shaft 22. Specifically, control shaft 22 is rotatably supported by cylinder block 11, and has an eccentric cam portion 22A that is eccentric to the rotation center of control shaft 22. A lower end portion of control link 21 is rotatably fitted to eccentric cam portion 22A.

Electric actuator 23 is equipped with a motor, described below, as a drive source, and a rotary output of the motor is decelerated by a reducer 23A, and then is transmitted to an output shaft 23B. The rotary output transmitted to output shaft 23B is further transmitted to control shaft 22 by engagement between a gear (e.g., worm gear) 23C formed on output shaft 23B and a gear (e.g., worm wheel) 22B formed on control shaft 22. Rotational angle (actual angle)$_R$ of output shaft 23B is measured by a rotational angle sensor 23D, such as a resolver, in which a rotor is attached to output shaft 23B, and rotational angle sensor 23D outputs an actual angle signal corresponding to actual angle (3.

In such a VCR mechanism 20, the rotational angle of control shaft 22 is controlled by making output shaft 23B of electric actuator 23 rotate forward or in reverse. When control shaft 22 rotates, the center position of eccentric cam portion 22A that is eccentric to the rotation center of control shaft 22 changes. This changes the pivotal support position of the lower end of control link 21, so that the position of piston 12 at the piston top dead center (TDC) becomes higher or lower, and the volume of combustion chamber S thereby increases or decreases to change the compression ratio of internal combustion engine 10 to lower compression ratio or higher compression ratio. Therefore, the compression ratio of internal combustion engine 10 changes depending on the rotational angle of output shaft 23B.

The combustion control of internal combustion engine 10 is performed by electronically controlling, for example, an injection amount and an injection timing of fuel injection valve 17, and an ignition timing of the ignition plug, by means of an engine control unit (ECU) 30. ECU 30 includes a microcomputer, and in order to determine the operation state of internal combustion engine 10, ECU 30 is configured to receive various signals, such as an output signal from a rotational speed sensor 31 that measures rotational speed Ne of internal combustion engine 10, and an output signal from a load sensor 32 that measures load Q of internal combustion engine 10. For load Q of internal combustion engine 10, a state quantity closely related to torque generated by internal combustion engine 10, such as intake negative pressure, intake flow rate, supercharging pressure, accelerator opening degree, or throttle opening degree, may be used.

Furthermore, ECU 30 calculates a target compression ratio depending on rotational speed Ne and load Q of internal combustion engine 10, by referring to, for example, a map in which a compression ratio suitable for a rotational speed and a load of internal combustion engine 10 is set. Furthermore, ECU 30 calculates rotational angle (target angle) βt of output shaft 23B depending on the target compression ratio. Then, ECU 30 outputs a signal corresponding to target angle βt (i.e., target angle signal) to a VCR controller 40 communicatively connected via, for example, a controller area network (CAN).

VCR controller 40 controls the motor of electric actuator 23 based on the target angle signal output from ECU 30, the actual angle signal output from rotational angle sensor 23D, and various output signals, described below, output from electric actuator 23. VCR controller 40 constitutes a motor control device. Forward and reverse rotation drive of output shaft 23B is controlled by VCR controller 40.

Figure 2:
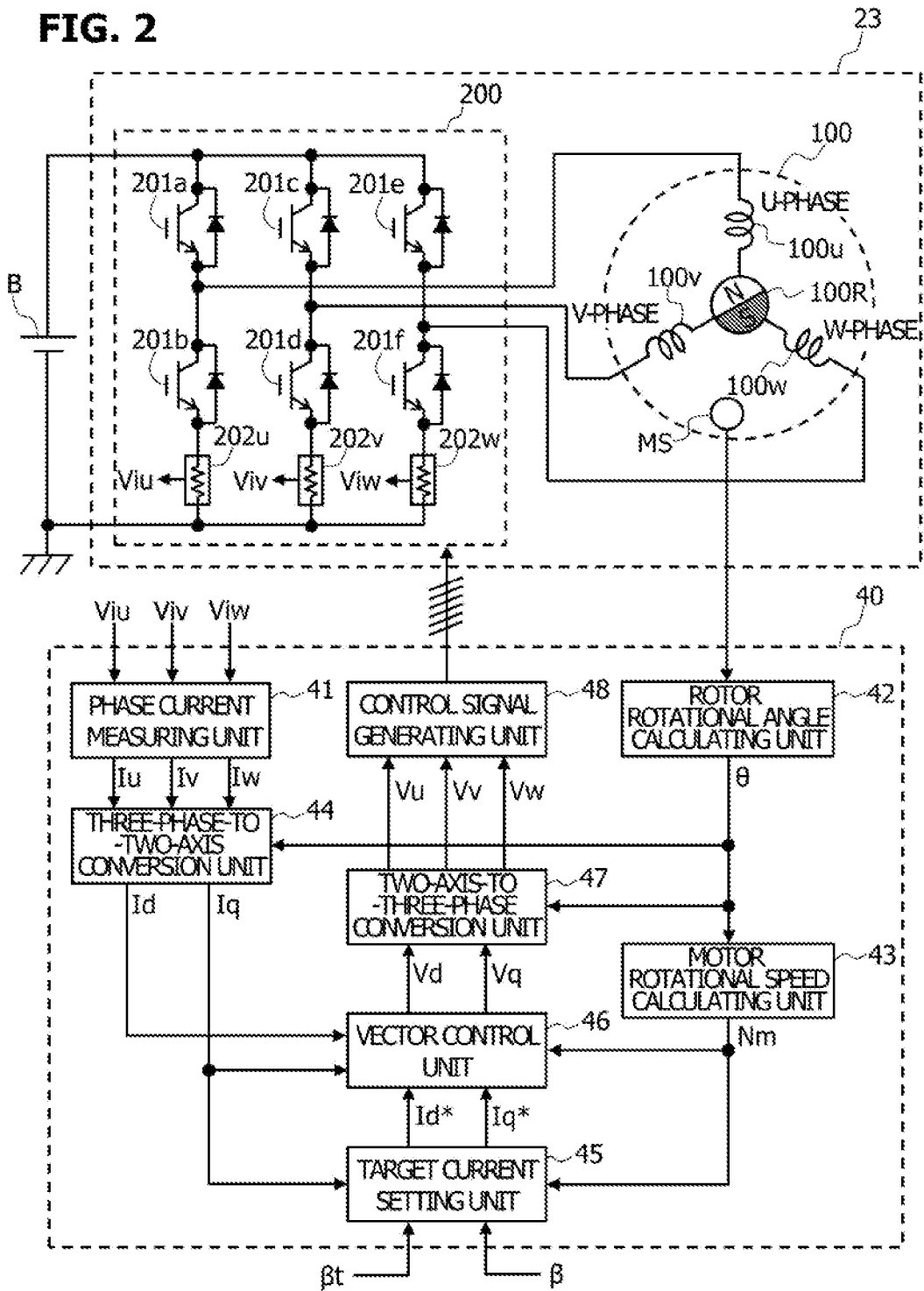
FIG. 2 is a circuit diagram illustrating an example of the motor control device and an example of an electric actuator.

FIG. 2 illustrates an example of internal configurations of the electric actuator and the VCR controller. Electric actuator 23 includes a motor 100, as described above. Motor 100 is a three-phase brushless motor, and includes a rotor (permanent magnet rotor) 100R rotatably disposed at the axial center of a space formed at the center of a cylindrical stator (not shown). Three-phase coils of a U-phase coil 100u, a V-phase coil 100v, and a W-phase coil 100w are wound around the stator, and are star-connected. Near motor 100, there is provided a magnetic field determination sensor MS, such as a Hall element or a Hall integrated circuit (IC), which determines a change in magnetic field due to rotation of a rotor 100R. Magnetic field determination sensor MS outputs a magnetic field determination signal depending on rotational angle θ of rotor 100R.

Furthermore, electric actuator 23 includes an inverter 200 that converts direct-current (DC) power of an on-board battery B into alternating-current (AC) power, and supplies the AC power to the three-phase coils of motor 100. In inverter 200, between a bus on the positive electrode side of on-board battery B and a bus on the negative electrode side of on-board battery B, there is provided three pairs of upper and lower arms connected in parallel, one pair for each phase. Each pair is composed of two switching elements. U-phase arms have switching elements 201a, 201b, connected in series, V-phase arms have switching elements 201c, 201d, connected in series, and W-phase arms have switching elements 201e, 201f, connected in series. The two switching elements of the upper and lower arms in each phase are connected to the coil in the corresponding phase of motor 100. Thereby, a three-phase bridge circuit is constituted. Switching elements 201a to 201f are composed of semiconductor elements for use in power control, such as field effect transistors (FETs) or insulated gate bipolar transistors (IGBTs), in which diodes are connected in antiparallel. A control terminal (e.g., gate terminal) of each switching element 201a to 201f is connected to an output port of VCR controller 40.

Inverter 200 includes a current measuring unit at each phase arm pair (i.e., U-phase current measuring unit 202u, V-phase current measuring unit 202v, and W-phase current measuring unit 202w) for measuring corresponding phase current Iu, Iv, Iw. Each current measuring unit is, for example, a current sensor configured to measure the potential difference between both ends of a shunt resistor by means of, for example, an operational amplifier. Each current measuring unit outputs potential difference Viu, Viv, Viw, between both ends of the shunt resistor as a current measurement signal depending on phase current Iu, Iv, Iw.

Next, VCR controller 40 is provided with a microcomputer including: a microprocessor, such as a central processing unit (CPU) and a micro processing unit (MPU); a memory device, such as a read only memory (ROM) and a random access memory (RAM); and an input-output interface.

VCR controller 40 receives the current measurement signals output from the current measuring units, the magnetic field determination signal output from magnetic field determination sensor MS, the target angle signal output from ECU 30, and the actual angle signal output from rotational angle sensor 23D. VCR controller 40 is configured to then output, based on these signals, a control signal for controlling switching of the on and off states of switching elements 201a to 201f in inverter 200, to the control terminal of each switching element 201a to 201f In response to the output of the control signal from VCR controller 40 to the control terminal of each switching element 201a to 201f, output shaft 23B of electric actuator 23 rotates. This changes the top dead center position of piston 12, and changes the compression ratio of internal combustion engine 10 to either lower compression ratio or higher compression ratio.

VCR controller 40 has the following configuration indicated as functional blocks into which the functions of VCR controller 40 are roughly divided. That is, VCR controller 40 includes a phase current measuring unit 41, a rotor rotational angle calculating unit 42, a motor rotational speed calculating unit 43, a three-phase-to-two-axis converting unit 44, a target current setting unit 45, a vector control unit 46, a two-axis-to-three-phase converting unit 47, and a control signal generating unit 48.

Phase current measuring unit 41 obtains the phase current of each phase, as phase current measurement Iu, Iv, Iw, based on an analog-to-digital (A/D) conversion value obtained by converting the current measurement signal of a corresponding phase current measuring unit 202u, 202v, 202w, by an A/D convertor (not shown).

Rotor rotational angle calculating unit 42 calculates rotational angle θ of rotor 100R of motor 100 based on the magnetic field determination signal output from magnetic field determination sensor MS. Motor rotational speed calculating unit 43 calculates actual rotational speed Nm of motor 100 based on a change over time of rotational angle θ of rotor 100R calculated by rotor rotational angle calculating unit 42. Here, when actual rotational speed Nm has a negative value, motor 100 is rotating in a direction for increasing the compression ratio, whereas when actual rotational speed Nm has a positive value, motor 100 is rotating in a direction for decreasing the compression ratio.

Three-phase-to-two-axis converting unit 44 converts phase current measurements Iu, Iv, Iw, obtained by phase current measuring unit 41, into a d-axis current measurement Id and a q-axis current measurement Iq in a d-q coordinate system, based on rotational angle θ of rotor 100R at that time. The d-q coordinate system is a rotational coordinate system defined so that the direction of a field rotating in synchronization with rotor 100R, which is a permanent magnet rotor of motor 100, is aligned along the d-axis, and the torque generation direction orthogonal to the d-axis is aligned along the q-axis.

Target current setting unit 45 obtains target angle βt of output shaft 23B from the target angle signal, and also obtains actual angle θ of output shaft 23B from the actual angle signal. Then, target current setting unit 45 sets d-axis current command value Id* and q-axis current command value Iq*, based on multiple parameters. The parameters for the setting are target angle βt and actual angle β, actual rotational speed Nm of motor 100 calculated by motor rotational speed calculating unit 43, and q-axis current measurement Iq obtained by conversion executed by three-phase-to-two-axis converting unit 44. Details of various processes for setting d-axis current command value Id* and q-axis current command value Iq* in target current setting unit 45 will be described later.

Vector control unit 46 calculates command value Vd for d-axis voltage (d-axis voltage command value Vd) and command value Vq for q-axis voltage (q-axis voltage command value Vq) in the d-q coordinate system, based on the multiple parameters. The parameters used in this calculation are d-axis current command value Id* and q-axis current command value Iq*, actual rotational speed Nm of motor 100 calculated by motor rotational speed calculating unit 43, and d-axis current measurement Id and q-axis current measurement Iq, obtained by three-phase-to-two-axis converting unit 44. That is, vector control unit 46 calculates d-axis voltage command value Vd and q-axis voltage command value Vq so that d-axis current measurement Id approaches d-axis current command value Id*, and q-axis current measurement Iq approaches q-axis current command value Iq*, by current feedback control, such as proportional-integral control, considering actual rotational speed Nm of motor 100.

Two-axis-to-three-phase converting unit 47 converts d-axis voltage command value Vd and q-axis voltage command value Vq, calculated by vector control unit 46, into three-phase voltage command values of U-phase voltage command value Vu, V-phase voltage command value Vv, and W-phase voltage command value Vw, based on rotational angle θ of rotor 100R at that time.

Control signal generating unit 48 generates a control signal that is output to switching elements 201a to 201f based on three-phase voltage command values Vu, Vv, Vw. For example, control signal generating unit 48 determines rising and falling timings of a pulse width modulation (PWM) pulse for driving switching elements 201a to 201f based on comparison of three-phase voltage command values Vu, Vv, Vw, and a triangular wave carrier. Thereby, control signal generating unit 48 generates a PWM pulse as a control signal. Then, control signal generating unit 48 outputs the generated PWM pulse to the control terminal of each switching element 201a to 201f of inverter 200.

Figure 3:
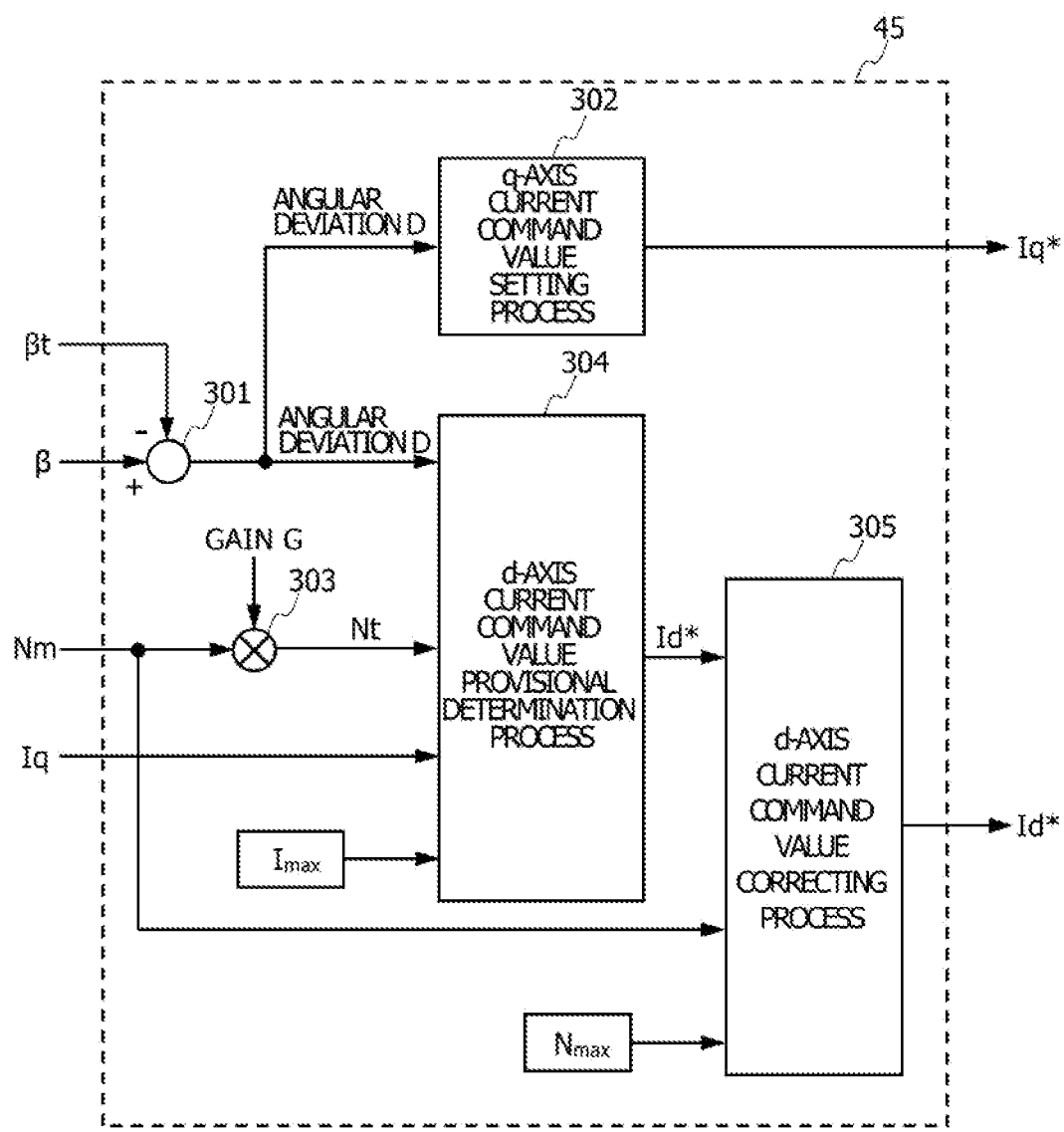
FIG. 3 is an explanatory view showing processes executed in a target current setting unit according to a first embodiment.

FIG. 3 illustrates an example of the contents of processes executed to calculate the d-axis current command value and the q-axis current command value in the target current setting unit of the VCR controller according to the first embodiment.

Target current setting unit 45 calculates q-axis current command value Iq* by executing an addition-and-subtraction process 301 and a q-axis current command value setting process 302. In addition-and-subtraction process 301, angular deviation D between target angle βt and actual angle β of output shaft 23B of electric actuator 23 is calculated. Here, it is assumed that when angular deviation D is a negative value, it means that motor 100 needs to be rotated in a direction for increasing the compression ratio in order to make actual angle β approach target angle βt. On the other hand, it is assumed that, when angular deviation D has a positive value, it means that motor 100 needs to be rotated in the direction for decreasing the compression ratio in order to make actual angle β approach target angle βt.

In q-axis current command value setting process 302, q-axis current command value Iq* is calculated so that actual angle β approaches target angle βt, by performing feedback control (e.g., proportional-integral control) based on angular deviation D.

Furthermore, in target current setting unit 45, there is executed the d-axis current command value setting process for setting d-axis current command value Id* to a negative value in order to perform flux weakening control in which a current is supplied to three-phase coils 100u, 100v, 100w in such a manner that the field flux of motor 100 is intentionally weakened. Target current setting unit 45 sets d-axis current command value Id* to a negative value when VCR controller 40 changes the top dead center position of piston 12 at least in a direction for decreasing the compression ratio by VCR mechanism 20. When the top dead center position of piston 12 is changed in the direction for decreasing the compression ratio, torque is applied in the same direction as the rotation direction of motor 100 due to the combustion pressure of internal combustion engine 10. Therefore, when the field flux of motor 100 is weakened, the rotational speed of motor 100 is more likely to increase, compared with a case in which the top dead center position of piston 12 is changed in the direction for increasing the compression ratio, and thus, it is possible to improve the responsiveness of VCR mechanism 20.

On the other hand, when VCR controller 40 makes VCR mechanism 20 change the top dead center position of piston 12 in a direction for increasing the compression ratio, torque is applied in a direction opposite to the rotation direction of motor 100 due to the combustion pressure of internal combustion engine 10. If VCR controller 40 performs the flux weakening control at this time, additional torque is applied in the direction opposite to the rotation direction of motor 100 due to the combustion pressure of internal combustion engine 10, even though torque generated by motor 100 decreases due to a decrease in field flux. Thus, there is concern that the responsiveness of VCR mechanism 20 may rather deteriorate. Therefore, when VCR controller 40 makes VCR mechanism 20 change the top dead center position of piston 12 in the direction for increasing the compression ratio, target current setting unit 45 sets d-axis current command value Id* to zero, so as not to execute the flux weakening control.

As the d-axis current command value setting process, target current setting unit 45 further executes a multiplication process 303, a d-axis current command value provisional determination process 304, and a d-axis current command value correcting process 305.

In multiplication process 303, actual rotational speed Nm of motor 100 is multiplied by predetermined gain G stored in advance in, for example, a ROM, to calculate target rotational speed Nt of motor 100, which serves as a parameter for use in setting of flux weakening amount $Id_{asm}$, as described later. Predetermined gain G is a value slightly greater than 1, and thus, the absolute value of target rotational speed Nt becomes a value slightly greater than the absolute value of actual rotational speed Nm of motor 100.

In d-axis current command value provisional determination process 304, d-axis current command value Id* is provisionally determined based on various parameters. The parameters for the provisional determination are angular deviation D between target angle βt and actual angle β of output shaft 23B, actual rotational speed Nm of motor 100, target rotational speed Nt of motor 100, q-axis current measurement Iq, and allowable current value Imax of motor 100 set in advance in, for example, a ROM. For example, d-axis current command value provisional determination process 304 provisionally determines d-axis current command value Id* by using, for example, a flux weakening amount setting map in which flux weakening amount $Id_{asm}$ is set in association with various parameters. Details of the process contents in d-axis current command value provisional determination process 304 will be described later.

In d-axis current command value correcting process 305, d-axis current command value Id* provisionally determined in d-axis current command value provisional determination process 304 is corrected based on actual rotational speed Nm of motor 100, and upper rotational speed limit Nmax of motor 100, which is set in advance in, for example, a ROM. Thereby, in d-axis current command value correcting process 305, final d-axis current command value Id* is set. Details of the process contents in d-axis current command value correcting process 305 will be described later.

Herein, it is described that the functions achieved by the units of VCR controller 40 are implemented by the microcomputer that reads and executes the pre-stored program in a memory device, such as a ROM. However, some of or all of the functions achieved by the units of VCR controller 40 may be implemented by a hardware configuration.

FIG. 4 illustrates an example of the flux weakening amount setting map for setting flux weakening amount $Id_{asm}$ in d-axis current command value provisional determination process 304. As shown in FIG. 4, the flux weakening amount setting map has two grid axes, that is, the angular deviation between the target rotational angle and the actual angle of output shaft 23B, and the target rotational speed of motor 100. The flux weakening amount setting map is configured as a three-dimensional map in which flux weakening amount $Id_{asm}$ is stored at each grid point. This flux weakening amount setting map is stored in advance in, for example, a ROM. The relationship between flux weakening amount $Id_{asm}$ and the angular deviation in the flux weakening amount setting map, and the relationship between flux weakening amount $Id_{asm}$ and the target rotational speed in the flux weakening amount setting map are obtained based on, for example, simulation results and experimental results.

In the flux weakening amount setting map, when the target rotational speed has a negative value, it means that motor 100 is rotated in the direction for increasing the compression ratio, whereas when the target rotational speed has a positive value, it means that motor 100 is rotated in the direction for decreasing the compression ratio. Furthermore, in the flux weakening amount setting map, when the angular deviation is a negative value, it means that motor 100 needs to be rotated in the direction for increasing the compression ratio. On the other hand, when the angular deviation is a positive value, it means that motor 100 needs to be rotated in the direction for decreasing the compression ratio.

In the flux weakening amount setting map, when at least one of the target rotational speed of motor 100 and the angular deviation is a negative value, flux weakening amount $Id_{asm}$ is stored as zero. When at least one of the target rotational speed of motor 100 and the angular deviation has a negative value, torque is applied to motor 100 from the exterior in a direction opposite to the rotation direction of motor 100 due to the combustion pressure of internal combustion engine 10. There is concern that if VCR controller 40 performs the flux weakening control at this time, the responsiveness of VCR mechanism 20 may rather deteriorate. Therefore, in the flux weakening amount setting map, the range in which VCR controller 40 performs the flux weakening control is, at most, a range in which the target rotational speed of motor 100 and the angular deviation are both positive values (hereinafter, referred to as "compression ratio decreasing range").

In the flux weakening amount setting map, flux weakening amount $Id_{asm}$ is stored as zero in a range in which the target rotational speed is less than predetermined rotational speed $N_0$ of motor 100 (e.g., 2000 rpm, which is the rated rotational speed). in the compression ratio decreasing range. It should be noted that the flux weakening control is not performed at startup of motor 100. When control shaft 22 starts rotating in response to startup of motor 100, it is assumed that a relatively large startup torque is required, depending on mechanical characteristics, or the like, of VCR mechanism 20. However, if the flux weakening control is performed, the field flux of motor 100 is thereby weakened, and the generated torque also decreases. Thus, if the flux weakening control is performed at startup of motor 100, the responsiveness at a rise time of VCR mechanism 20 might deteriorate, compared with a case in which the flux weakening control is not performed. Thus, in the flux weakening amount setting map, flux weakening amount $Id_{asm}$ is set such that the flux weakening control is not performed in the range in which the target rotational speed is less than predetermined rotational speed $N_0$, such as at startup of motor 100.

Furthermore, in the flux weakening amount setting map, flux weakening amount $Id_{asm}$ is stored as zero in a range in which the angular deviation between the target angle and the actual angle of output shaft 23B is less than predetermined deviation $D_0$ (e.g., 10 degrees), which is near zero, in the compression ratio decreasing range. The purpose of this is to prevent increasing of an impact force that is generated between the motor shaft and the reducer when the actual angle reaches the target angle and the rotation of motor 100 is stopped. The impact force may increase by an increase in rotational speed of motor 100 due to the flux weakening control. It also has the meaning of preventing overshoot in which actual angle β exceeds target angle βt.

Thus, VCR controller 40 sets the following range in the compression ratio decreasing range as a flux weakening control execution range in which the flux weakening control is performed. That is, the flux weakening control execution range is a range in which the target rotational speed is greater than or equal to predetermined rotational speed $N_0$ of motor 100 (e.g., 2000 rpm), and the angular deviation between the target angle and the actual angle of output shaft 23B is greater than or equal to predetermined deviation $D_0$ (e.g., 10 degrees).

In the flux weakening control execution range of the flux weakening amount setting map, the deviation between the target angle and the actual angle of output shaft 23B increases as the angular deviation increases. Thus, in order to increase the rotational speed of motor 100 so that the actual angle rapidly approaches the target angle, the absolute value of flux weakening amount $Id_{asm}$ increases as the angular deviation increases.

Furthermore, in the flux weakening control execution range of the flux weakening amount setting map, the absolute value of flux weakening amount $Id_{asm}$ also increases as the target rotational speed of motor 100 increases. This is because the field flux does not decrease and the rotational speed of motor 100 does not increase to the target rotational speed, unless the absolute value of flux weakening amount $Id_{asm}$ increases as the target rotational speed increases.

It should be noted that the reason why the absolute value of target rotational speed Nt is calculated to be a slightly greater value than the absolute value of actual rotational speed Nm by multiplying actual rotational speed Nm of motor 100 by predetermined gain G, which is slightly greater than 1, in the abovementioned multiplication process 303, is as follows. That is, this aims at ensuring a rapid and smooth increase in actual rotational speed Nm due to the flux weakening control, and at preventing the flux weakening control from starting at a relatively low rotational speed.

Figure 5:
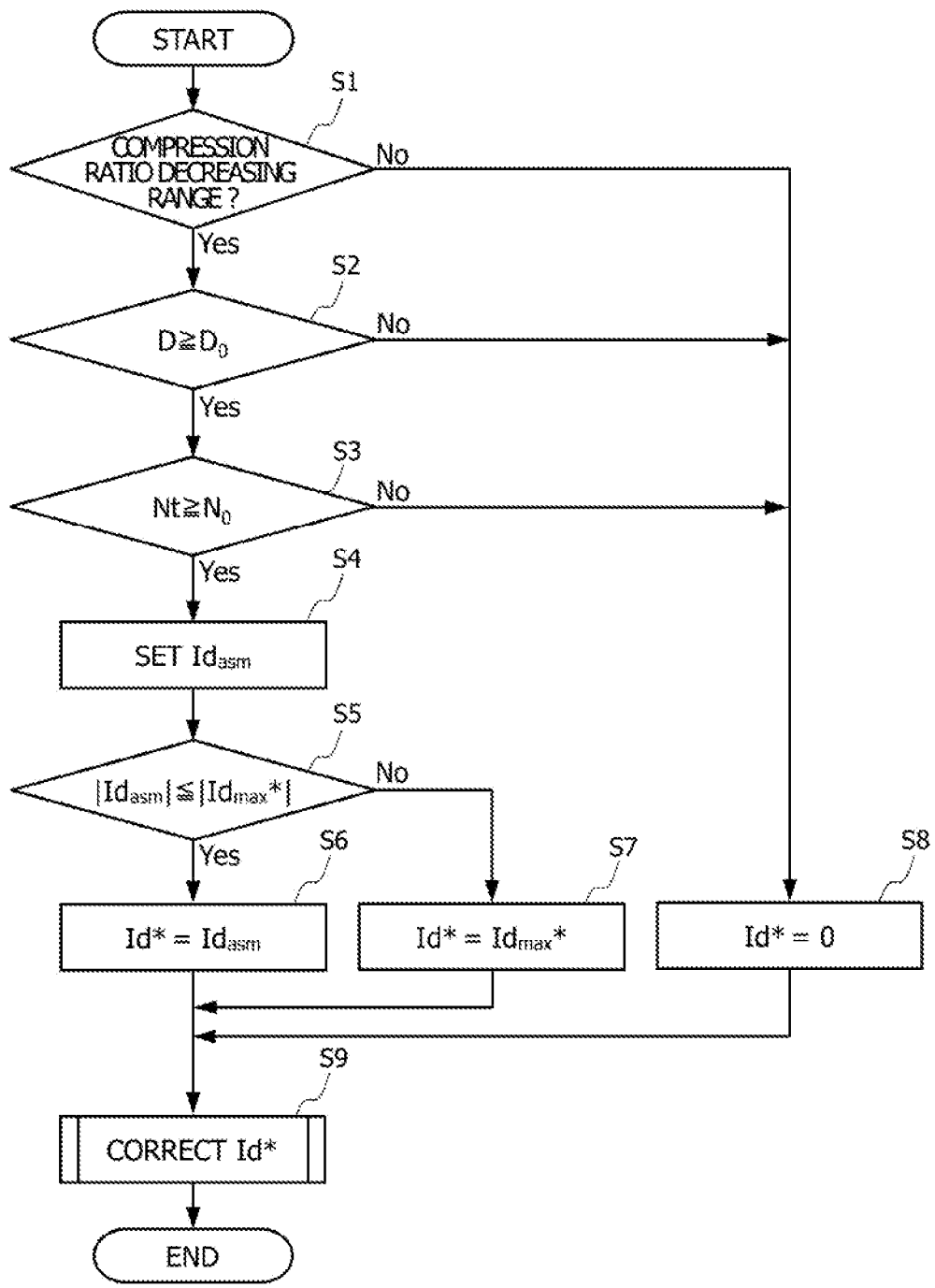
FIG. 5 is a flowchart illustrating an example of a d-axis current command value setting process.

FIG. 5 illustrates an example of the process contents in the d-axis current command value setting process, which is repeatedly executed in the target current setting unit of the VCR controller, when the ignition switch of the vehicle is turned on and the power supply to the VCR controller is thereby started.

In step S1 (abbreviated as "S1" in the figure, the same applies hereinafter), target current setting unit 45 determines whether, in the flux weakening amount setting map, target rotational speed Nt and angular deviation D are the target rotational speed and the angular deviation in the compression ratio decreasing range, respectively. When target current setting unit 45 determines that target rotational speed Nt and angular deviation D are positive values (YES), target current setting unit 45 determines that target rotational speed Nt and angular deviation D are within the compression ratio decreasing range, and the process proceeds to step S2. On the other hand, when target current setting unit 45 determines that target rotational speed Nt and angular deviation D are less than or equal to zero (NO), target current setting unit 45 determines that target rotational speed Nt and angular deviation D are outside the compression ratio decreasing range, and the process proceeds to step S8, so as not to execute the flux weakening control.

In step S2, target current setting unit 45 determines whether angular deviation D is greater than or equal to predetermined deviation $D_0$ in the flux weakening amount setting map. When target current setting unit 45 determines that angular deviation D is greater than or equal to predetermined deviation $D_0$ (YES), the process proceeds to step S3. On the other hand, when target current setting unit 45 determines that angular deviation D is less than predetermined deviation $D_0$ (NO), angular deviation D is outside the flux weakening control execution range, and thus, the process proceeds to step S8, so as not to execute the flux weakening control.

In step S3, target current setting unit 45 determines whether target rotational speed Nt is greater than or equal to predetermined rotational speed $N_0$ in the flux weakening amount setting map. When target current setting unit 45 determines that target rotational speed Nt is greater than or equal to predetermined rotational speed $N_0$ (YES), target rotational speed Nt is within the flux weakening control execution range, and thus, the process proceeds to step S4, so as to perform the flux weakening control. On the other hand, when target current setting unit 45 determines that target rotational speed Nt is less than predetermined rotational speed $N_0$ (NO), target rotational speed Nt is outside the flux weakening control execution range, and thus, the process proceeds to step S8, so as not to execute the flux weakening control.

In step S4, target current setting unit 45 refers to the flux weakening amount setting map to set flux weakening amount $Id_{asm}$ corresponding to angular deviation D and target rotational speed Nt. Here, if target current angular deviation D and target rotational speed Nt do not correspond to any angular deviations and any target rotational speeds in the grid axis of the flux weakening amount setting map, flux weakening amount $Id_{asm}$ may be calculated by a known interpolation method.

In step S5, target current setting unit 45 determines whether absolute value $|Id_{asm}|$ of flux weakening amount $Id_{asm}$, set in step S4, is less than or equal to absolute value $|Idmax^*|$ of upper limit $Idmax^*$ of d-axis current command value $Id^*$. Herein, upper limit $Idmax^*$ is calculated based on intrinsic allowable current Imax determined depending on the heat resistance limit of the energization system of motor 100, and based on q-axis current measurement Iq calculated by three-phase-to-two-axis converting unit 44. Specifically, it is calculated by the following relational expression.

$$Idmax^* = -(Imax^2 - Iq^2)^{1/2}$$

In step S5, when target current setting unit 45 determines that absolute value $|Id_{asm}|$ of flux weakening amount $Id_{asm}$ is less than or equal to absolute value $|Idmax^*|$ of upper limit $Idmax^*$ (YES), the process proceeds to step S6. Then, in step S6, target current setting unit 45 provisionally determines d-axis current command value $Id^*$ to be flux weakening amount $Id_{asm}$, set in step S4, (i.e., $Id^* = Id_{asm}$), and the process proceeds to step S9.

On the other hand, in step S5, when target current setting unit 45 determines that absolute value $|Id_{asm}|$ exceeds absolute value $|Idmax^*|$ (NO), the process proceeds to step S7, so as to ensure the heat resistance protection of the energization system of motor 100. Then, in step S7, target current setting unit 45 provisionally determines d-axis current command value $Id^*$ to be upper limit $Idmax^*$ of d-axis current command value $Id^*$ (i.e., $Id^* = Idmax^*$), and the process proceeds to step S9.

In step S8, target current setting unit 45 sets d-axis current command value $Id^*$ to zero (i.e., $Id^* = 0$), so as not to execute the flux weakening control, and the process proceeds to step S9. The processes in steps S1 to S8 correspond to d-axis current command value provisional determination process 304. Here, if d-axis current command value $Id^*$ is zero, actual rotational speed Nm is unlikely to exceed upper rotational speed limit Nmax. Thus, step S9 may be omitted after step S8, and the d-axis current command value setting process may end thereby.

In step S9, target current setting unit 45 executes d-axis current command value correcting process 305. That is, target current setting unit 45 corrects d-axis current command value $Id^*$ provisionally determined in any one of steps S6 to S8. When the provisionally determined d-axis current command value $Id^*$ is corrected in d-axis current command value correcting process 305, the corrected value is set as final d-axis current command value $Id^*$ for use in vector control unit 46. On the other hand, when provisionally determined d-axis current command value $Id^*$ is not corrected, provisionally determined d-axis current command value $Id^*$ is set as final d-axis current command value $Id^*$ for use in vector control unit 46. After step S9, target current setting unit 45 ends the d-axis current command value setting process.

Here, the necessity of correcting d-axis current command value $Id^*$, provisionally determined in any one of steps S6 to S8, by d-axis current command value correcting process 305, will be described. In order to ensure effectiveness of the fail-safe measure in VCR controller 40 while VCR mechanism 20 fails (for example, while electric actuator 23 fails), upper rotational speed limit Nmax that is greater than predetermined rotational speed $N_0$ is set for motor 100. For example, while predetermined rotational speed $N_0$ is 2000 rpm, upper rotational speed limit Nmax is set to 3000 rpm. Upper rotational speed limit Nmax of motor 100 is set based on a safety measure period that is a time period required for the fail-safe measure, and an allowable deviation amount between a target position and an actual position (i.e., target angle βt and actual angle β of output shaft 23B) of the top dead center position of piston 12. As described above, when the top dead center position of piston 12 is changed in the direction for decreasing the compression ratio, torque is applied to motor 100 from the exterior in the same direction as the rotation direction of motor 100 due to the combustion pressure of internal combustion engine 10. At this time, there is concern that, if VCR controller 40 performs the flux weakening control to weaken the field flux of motor 100, rotational speed Nm of motor 100 will rapidly increase and will exceed predetermined upper rotational speed limit Nmax, so that effective fail-safe measures may not be possible when VCR mechanism 20 fails. Thus, when actual rotational speed Nm of motor 100 exceeds upper rotational speed limit Nmax due to the flux weakening control, target current setting unit 45 performs d-axis current command value correcting process 305 having the following contents. That is, target current setting unit 45 corrects provisionally determined d-axis current command value $Id^*$ to set final d-axis current command value $Id^*$, such that actual rotational speed Nm of motor 100 converges to upper rotational speed limit Nmax.

Figure 6:
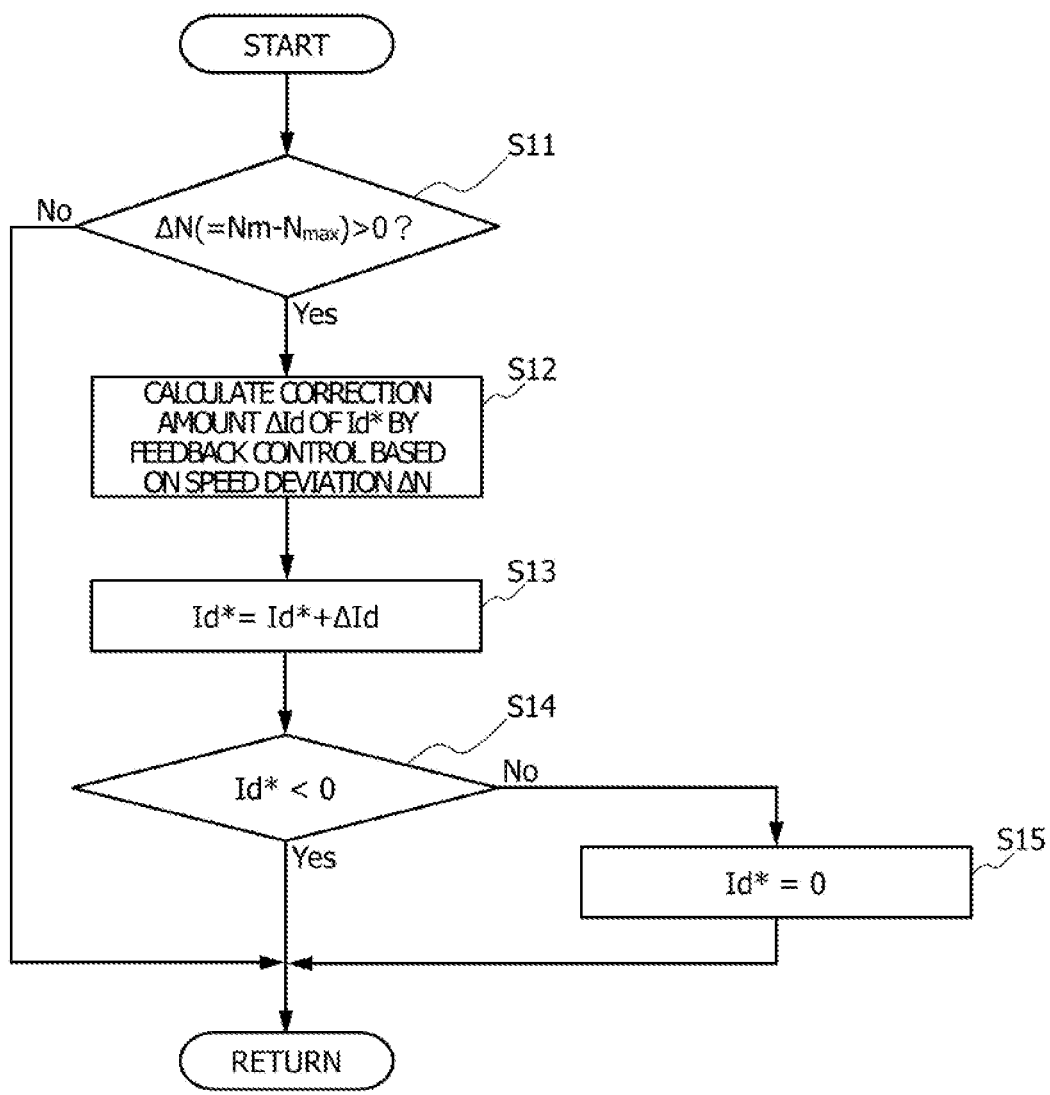
FIG. 6 is a flowchart showing a d-axis current command value correcting process according to the first embodiment.

FIG. 6 illustrates an example of the d-axis current command value correcting process executed in step S9 of the d-axis current command value setting process.

In step S11, target current setting unit 45 determines whether actual rotational speed Nm calculated in motor rotational speed calculating unit 43 exceeds upper rotational speed limit Nmax set in advance in, for example, a ROM. In other words, target current setting unit 45 determines whether speed deviation ΔN, obtained by subtracting upper rotational speed limit Nmax from actual rotational speed Nm (i.e., ΔN=Nm−Nmax), is greater than zero. When target current setting unit 45 determines that speed deviation ΔN is greater than zero (YES), the process proceeds to step S12, so as to make actual rotational speed Nm converge to upper rotational speed limit Nmax. On the other hand, when target current setting unit 45 determines that speed deviation ΔN is less than or equal to zero (NO), since there is no need to correct provisionally determined d-axis current command value $Id^*$, target current setting unit 45 ends d-axis current command value correcting process 305.

In step S12, target current setting unit 45 calculates correction amount ΔId of provisionally determined d-axis current command value $Id^*$ based on speed deviation ΔN calculated in step S11, such that actual rotational speed Nm converges to upper rotational speed limit Nmax. Correction amount ΔId of provisionally determined d-axis current command value $Id^*$ may be calculated by appropriately adopting various feedback controls.

For example, correction amount ΔId of provisionally determined d-axis current command value Id* may be calculated according to the following equation by proportional-integral control (PI control) based on speed deviation ΔN.

Correction amount $\Delta Id = \Delta N^*$(proportional gain)+
(integral value of $\Delta N$)*(integral gain)

Alternatively, for example, correction amount ΔId of provisionally determined d-axis current command value Id* may be calculated according to the following equation by proportional-integral-derivative control (PID control) based on speed deviation ΔN.

Correction amount $\Delta Id = \Delta N^*$(proportional gain)+
(integral value of $\Delta N$)*(integral gain)+(derivative value of $\Delta N$)*(derivative gain)

In step S13, target current setting unit 45 adds correction amount ΔId to provisionally determined d-axis current command value Id*, to calculate final d-axis current command value Id* as the left-hand side of the following equation.

$Id^* = Id^* + \Delta Id$

In step S14, target current setting unit 45 determines whether d-axis current command value Id*, calculated in step S13, is less than zero. When target current setting unit 45 determines that d-axis current command value Id* is less than zero (YES), target current setting unit 45 ends d-axis current command value correcting process 305. On the other hand, when target current setting unit 45 determines that d-axis current command value Id* is greater than or equal to zero (NO), since it means that the flux weakening control will not be performed, the process proceeds to step S15. Then, in step S15, target current setting unit 45 sets final d-axis current command value Id* to zero (Id*=0), and ends d-axis current command value correcting process 305.

Figure 7A:
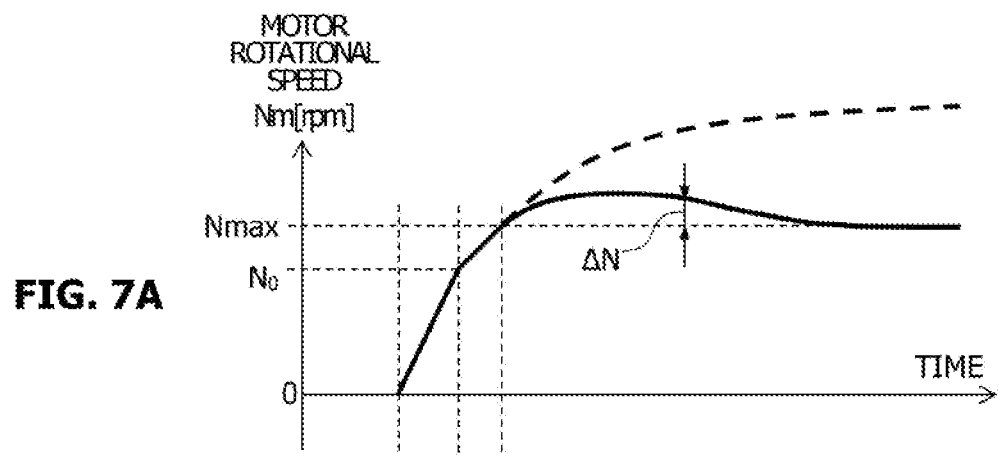
FIGS. 7A to 7D are timing diagrams showing effects of flux weakening control.
Figure 7B:
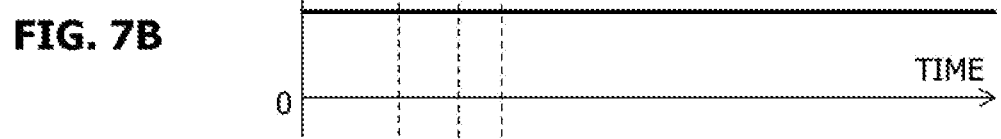

Next, referring to FIGS. 7A to 7D, effects of the flux weakening control performed by the VCR controller will be described. FIG. 7A schematically illustrates a change over time of actual rotational speed of the motor, FIG. 7B schematically illustrates a change over time of torque externally applied to the motor, FIG. 7C schematically illustrates a change over time of d-axis current command value, and FIG. 7D schematically illustrates a change over time of q-axis current command value.

A case in which VCR controller 40 has VCR mechanism 20 change the top dead center position of piston 12 in the direction for decreasing the compression ratio will be described. As shown in FIG. 7D, target current setting unit 45 calculates q-axis current command value Iq* based on angular deviation D between actual angle β and target angle βt of output shaft 23B when the top dead center position is changed in the direction for decreasing the compression ratio. Actual rotational speed Nm of motor 100 thereby becomes a positive value as shown in FIG. 7A. At this time, as shown in FIG. 7B, torque is applied to motor 100 from the exterior in the same direction as the rotation direction due to the combustion pressure of internal combustion engine 10. As shown in FIGS. 7A and 7C, target current setting unit 45 does not perform the flux weakening control until target rotational speed Nt obtained by multiplying actual rotational speed Nm by gain G becomes equal to predetermined rotational speed $N_0$. That is, target current setting unit 45 sets d-axis current command value Id* to zero.

Figure 7C:
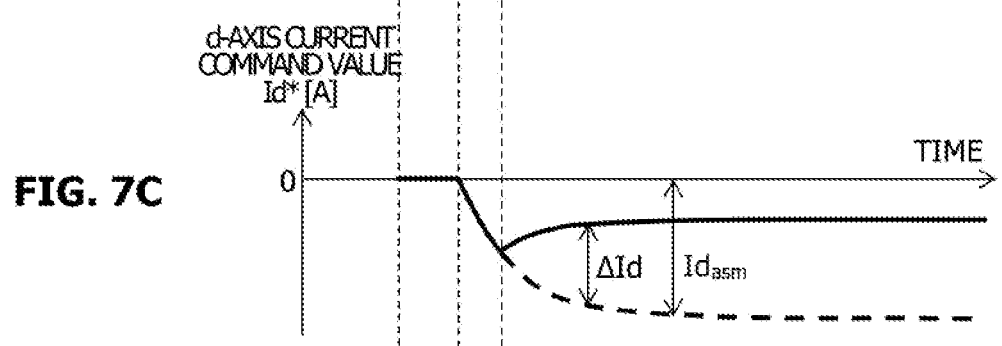
Figure 7D:
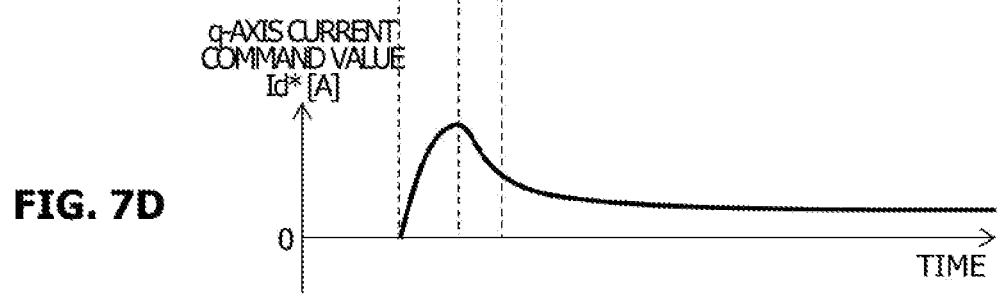

When target rotational speed Nt reaches predetermined rotational speed $N_0$, as shown in FIG. 7A, target current setting unit 45 sets d-axis current command value Id* to a negative value based on flux weakening amount $Id_{asm}$, as shown in FIG. 7C, so as to start the flux weakening control. When actual rotational speed Nm of motor 100 increases thereby, target rotational speed Nt increases, and absolute value $|Id_{asm}|$ of flux weakening amount $Id_{asm}$ also increases, so that the value of d-axis current command value Id* decreases, and thus, actual rotational speed Nm further increases. When actual rotational speed Nm exceeds upper rotational speed limit Nmax, target current setting unit 45 corrects d-axis current command value Id*, such that actual rotational speed Nm converges to upper rotational speed limit Nmax. The correction of d-axis current command value Id* is performed by adding correction amount ΔId, set depending on speed deviation ΔN(=Nm−Nmax), to flux weakening amount $Id_{asm}$, as shown in FIGS. 7A and 7C. Actual rotational speed Nm thereby converges to upper rotational speed limit Nmax as shown in FIG. 7A.

By VCR controller 40 according to the first embodiment, it is possible to prevent actual rotational speed Nm from exceeding and deviating from upper rotational speed limit Nmax, even if the flux weakening control is performed when torque is applied to motor 100 from the exterior in the same direction as the rotation direction of motor 100. Since upper rotational speed limit Nmax is set to ensure the effectiveness of the fail-safe measure performed by VCR controller 40 when VCR mechanism 20 fails, it is possible to perform an effective fail-safe measure when VCR mechanism 20 fails.

Second Embodiment

Figure 8:
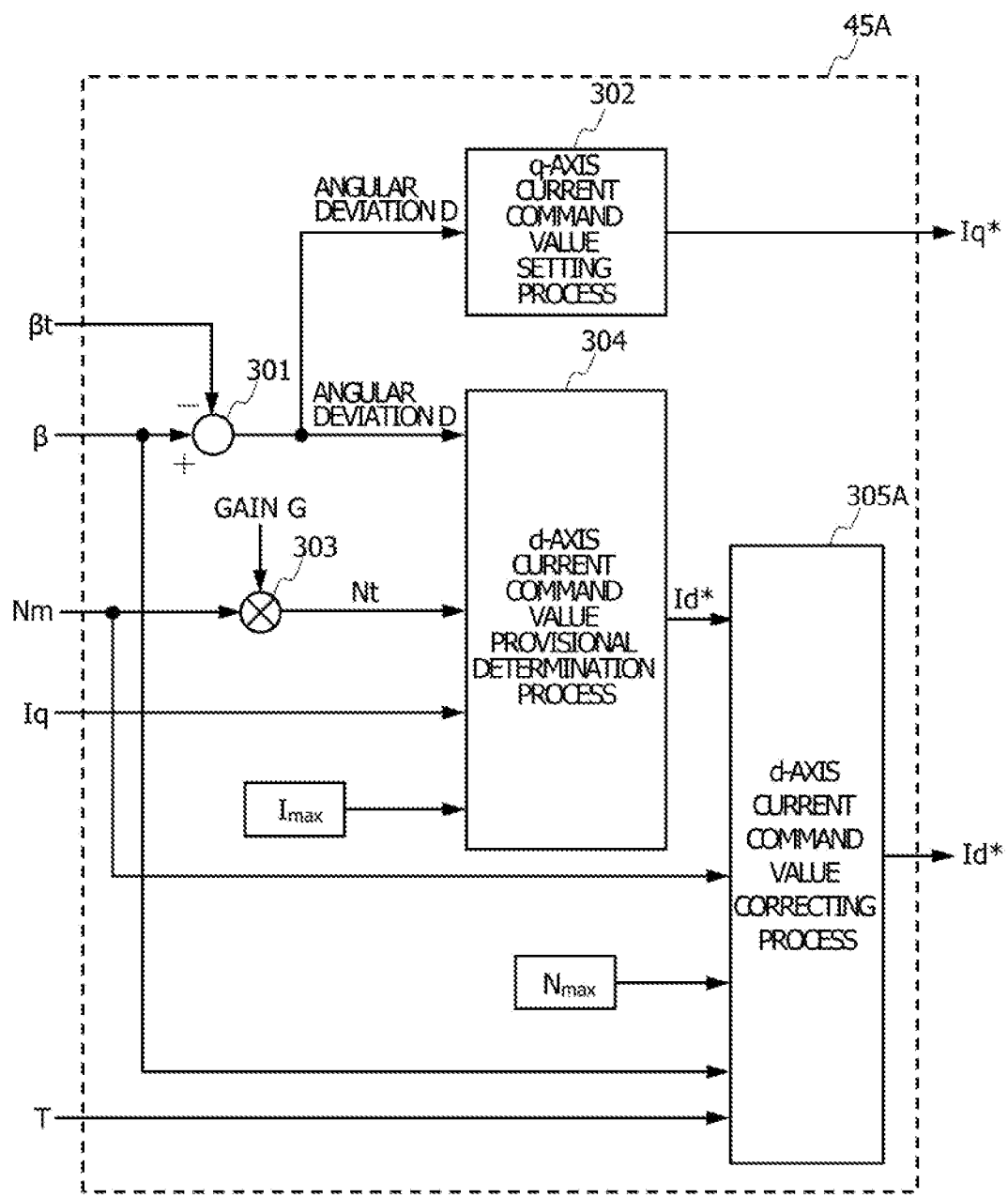
FIG. 8 is an explanatory view showing processes executed in a target current setting unit according to a second embodiment.

FIG. 8 shows the contents of processes executed to calculate the d-axis current command value and the q-axis current command value in the target current setting unit of the VCR controller according to a second embodiment. The same components as in the first embodiment are denoted by the same reference symbols, and their descriptions will therefore be omitted or simplified.

VCR controller 40 according to the second embodiment includes a target current setting unit 45A that executes a d-axis current command value correcting process 305A, in place of d-axis current command value correcting process 305, in step S9 of the d-axis current command value setting process. In d-axis current command value correcting process 305A, d-axis current command value Id* provisionally determined in d-axis current command value provisional determination process 304 is corrected based on torque T of internal combustion engine 10 and actual angle β of output shaft 23B, in addition to actual rotational speed Nm of motor 100 and upper rotational speed limit Nmax. With this correction, target current setting unit 45A sets final d-axis current command value Id*.

Figure 9:
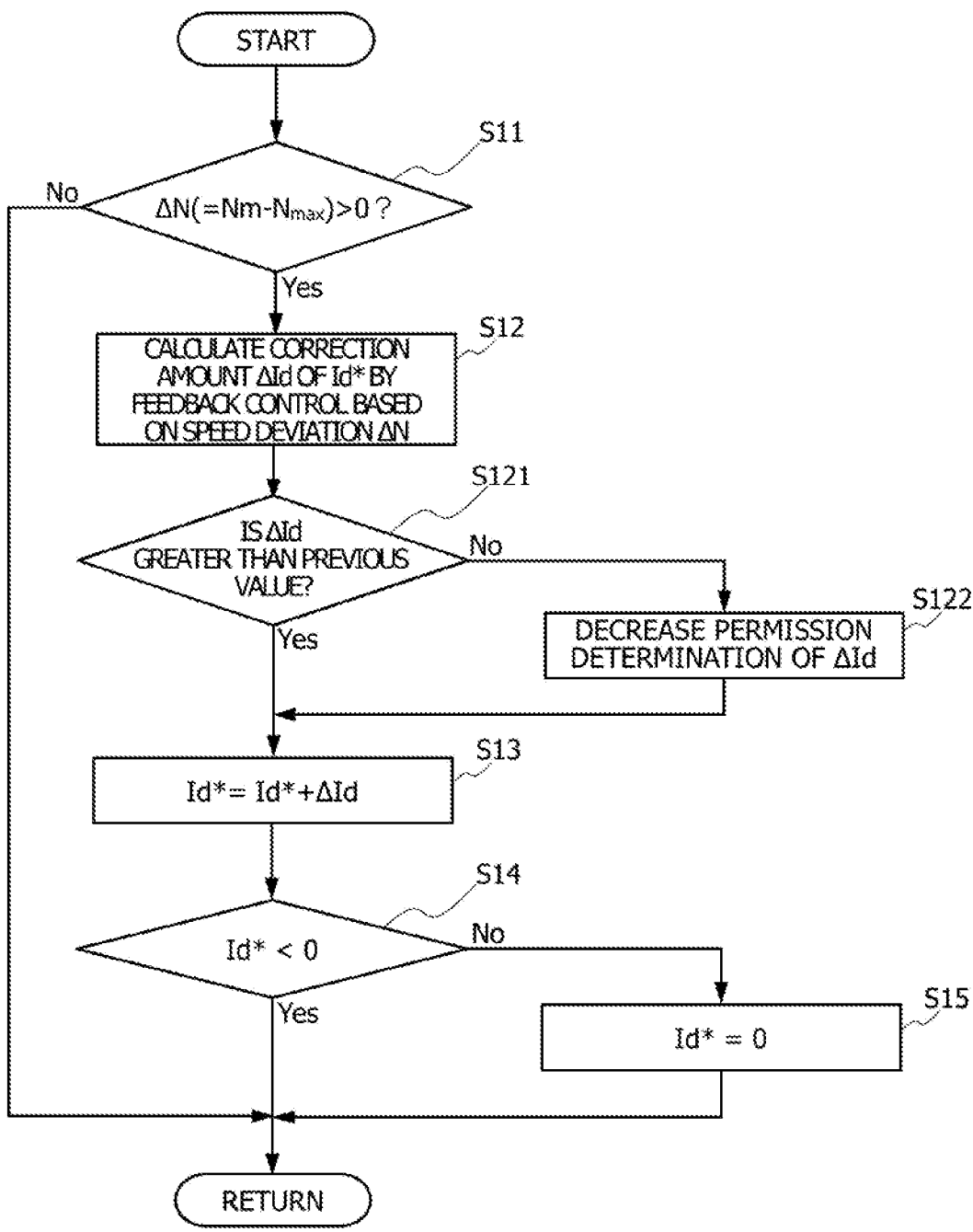
FIG. 9 is a flowchart showing a d-axis current command value correcting process according to the second embodiment.

FIG. 9 illustrates another example of the d-axis current command value correcting process performed in step S9 of the d-axis current command value setting process. The d-axis current command value correcting process 305A is different from d-axis current command value correcting process 305 according to the first embodiment (see FIG. 6) in that processes in steps S121 and S122 are executed between steps S12 and S13.

When target current setting unit 45A calculates correction amount ΔId of provisionally determined d-axis current command value Id* based on speed deviation ΔN in step S12, then target current setting unit 45A determines, in step S121, whether correction amount ΔId is greater than the latest previous value. When target current setting unit 45A determines that correction amount ΔId is greater than the previous value (YES), the process proceeds to step S13, and target current setting unit 45A corrects provisionally determined d-axis current command value Id* by correction amount ΔId calculated in step S12. On the other hand, when target current setting unit 45A determines, in step S121, that correction amount ΔId is less than or equal to the previous value (NO), the process proceeds to step S122.

In step S122, target current setting unit 45A determines whether a decrease in correction amount ΔId can be permitted, and then, when target current setting unit 45A permits a decrease in correction amount ΔId, it decreases correction amount ΔId. A state in which target current setting unit 45A determines that a decrease in correction amount ΔId can be permitted, is a state in which torque is unlikely to be applied to motor 100 from the exterior in the same direction as the rotation direction.

For such a state in which the torque is unlikely to be applied to motor 100 from the exterior in the same direction as the rotation direction, the following first to third states may be considered. The first state may be a state in which torque T applied to motor 100 from the exterior in the same direction as the rotation direction is less than predetermined torque $T_0$. The second state may be a state in which actual angle β of output shaft 23B is within predetermined angle range $R_β$ in which a load is unlikely to be applied from the exterior in a direction in which the output shaft 23B rotates, due to the characteristics of a link mechanism that connects piston 12 and control shaft 22. The third state may be a state in which the first and second states occur simultaneously.

Figure 10A:
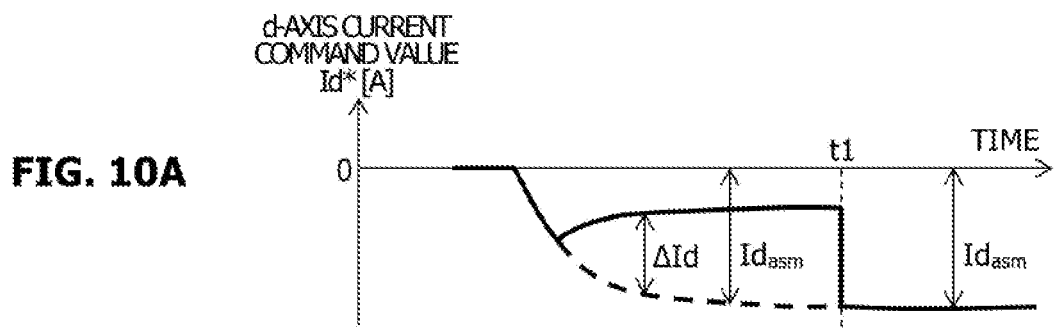
FIGS. 10A and 10B are timing diagrams showing the setting for a correction amount of a d-axis current command value.

Therefore, in step S122, target current setting unit 45A determines that a decrease in correction amount ΔId can be permitted, when at least one of the first state and the second state is satisfied, and then, target current setting unit 45A sets correction amount ΔId to zero. Then, in step S13, target current setting unit 45A stops the correction of provisionally determined d-axis current command value Id*, and sets final d-axis current command value Id* to a value of flux weakening amount $Id_{asm}$, (time t1 in FIG. 10A).

On the other hand, in step S122, when neither the first state nor the second state is satisfied, target current setting unit 45A determines not to permit a decrease in correction amount ΔId. Then, in step S13, target current setting unit 45A corrects provisionally determined d-axis current command value Id* by correction amount ΔId calculated in step S12, and thereby sets final d-axis current command value Id*.

Figure 10B:
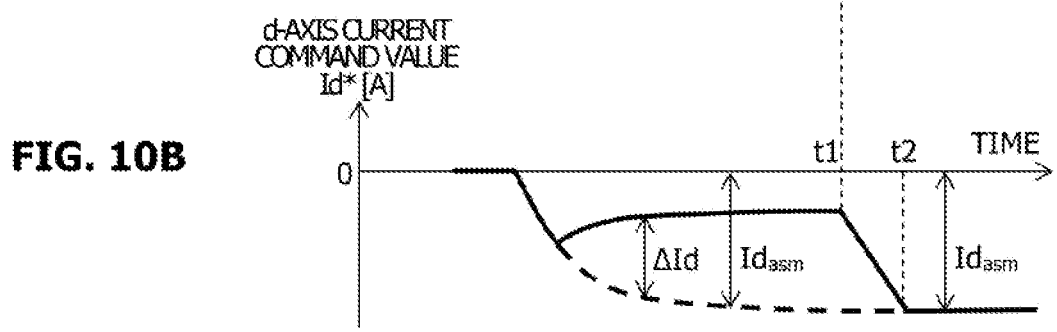

Alternatively, in step S122, when at least one of the first state and the second state, described above, is satisfied, target current setting unit 45A determines that the decrease in correction amount ΔId can be permitted. Then, target current setting unit 45A does not set correction amount ΔId to zero at once, but gradually decreases it, in step S122, each time at least one of the first state and the second state is satisfied. For example, when the first state is satisfied, target current setting unit 45A may gradually decrease correction amount ΔId depending on torque T applied to motor 100 from the exterior in the same direction as the rotation direction. This reduces an amount of correction of provisionally determined d-axis current command value Id* in step S13, and target current setting unit 45A set final d-axis current command value Id* such that final d-axis current command value Id* gradually decreases to flux weakening amount $Id_{asm}$ (from time t1 to time t2 in FIG. 10B).

By using VCR controller 40 according to the second embodiment, it is possible to reduce an excessive decrease in actual rotational speed Nm of motor 100, by preventing correction amount ΔId from being calculated to an unnecessarily large amount, in a state in which the torque is unlikely to be applied to motor 100 from the exterior in the same direction as the rotation direction.

Hereinbelow, a modification of the second embodiment will be described. In d-axis current command value correcting process 305A according to the second embodiment, target current setting unit 45A determines, in step S122, whether a decrease in correction amount ΔId can be permitted, and then, when target current setting unit 45A permits the decrease in correction amount ΔId, it decreases correction amount ΔId calculated in step S12, as described above. Alternatively, or in addition, target current setting unit 45A may determine whether an increase in correction amount ΔId can be permitted, and then, when target current setting unit 45A permits an increase in correction amount ΔId, target current setting unit 45A may increase correction amount ΔId calculated in step S12.

Figure 11:
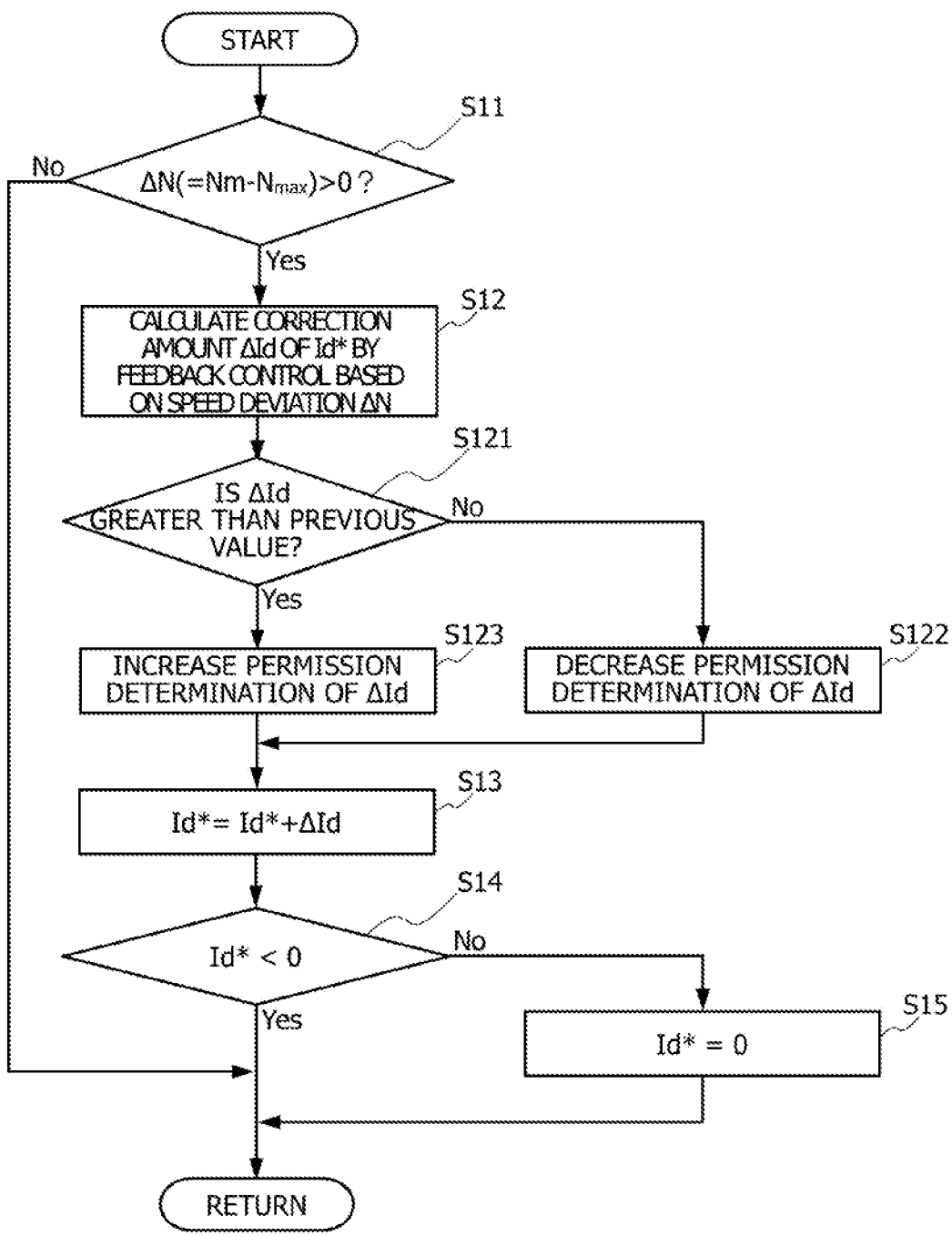
FIG. 11 is a flowchart illustrating another example of the d-axis current command value correcting process.

Specifically, as shown in FIG. 11, when target current setting unit 45A determines, in step S121, that correction amount ΔId is greater than the previous value (YES), the process proceeds to step S123. In step S123, target current setting unit 45A determines whether an increase in correction amount ΔId can be permitted, and then, when target current setting unit 45A permits an increase in correction amount ΔId, target current setting unit 45A increases correction amount ΔId calculated in step S12. A state in which target current setting unit 45A determines that an increase in correction amount ΔId can be permitted, is a state in which torque is easily applied to motor 100 from the exterior in the same direction as the rotation direction due to the combustion pressure of internal combustion engine 10.

For such a state in which the torque is easily applied to motor 100 from the exterior in the same direction as the rotation direction, the following fourth to sixth states may be considered. The fourth state may be a state in which torque T applied to motor 100 from the exterior in the same direction as the rotation direction is greater than or equal to predetermined torque $T_0$. The fifth state may be a state in which actual angle β of output shaft 23B is outside abovementioned angle range $R_β$. The sixth state may be a state in which the fourth and fifth states occur simultaneously.

Therefore, in step S123, target current setting unit 45A determines that an increase in correction amount ΔId can be permitted, when at least one of the fourth state and the fifth state is satisfied, and then, target current setting unit 45A increases correction amount ΔId. Then, in step S13, target current setting unit 45A corrects provisionally determined d-axis current command value Id* by increased correction amount ΔId, and thereby sets final d-axis current command value Id*. Alternatively, target current setting unit 45A may gradually increase correction amount ΔId, in step S123, each time at least one of the fourth state and the fifth state is satisfied. For example, when the fourth state is satisfied, target current setting unit 45A may gradually increase correction amount ΔId depending on torque T applied to motor 100 from the exterior in the same direction as the rotation direction. Thereby, in step S13, target current setting unit 45A sets final d-axis current command value Id* such that final d-axis current command value Id* gradually increases toward zero.

On the other hand, in step S123, when neither the fourth state nor the fifth state is satisfied, target current setting unit 45A determines not to permit an increase in correction amount ΔId. Then, in step S13, target current setting unit 45A corrects provisionally determined d-axis current command value Id* by correction amount ΔId calculated in step S12, and thereby sets final d-axis current command value Id*.

In such a modification of the second embodiment, it is possible to make the actual rotational speed rapidly converge to the upper rotational speed limit in a state in which torque is easily applied to motor 100 from the exterior in the same direction as the rotation direction.

In the first and second embodiments, when actual rotational speed Nm of motor 100 exceeds upper rotational speed limit Nmax, provisionally determined d-axis current command value Id* is corrected such that actual rotational speed Nm converges to upper rotational speed limit Nmax, as described above. Alternatively, target current setting units 45, 45A may be configured not to multiply actual rotational speed Nm by gain G in multiplication process 303, when target rotational speed Nt becomes upper rotational speed limit Nmax or a value near upper rotational speed limit Nmax. Thus, in d-axis current command value provisional determination process 304, it is possible to prevent an increase in actual rotational speed Nm of motor 100 by preventing an increase in absolute value |Id$_{asm}$| of flux weakening amount Id$_{asm}$.

Alternatively, in q-axis current command value setting process 302, target current setting unit 45, 45A may set q-axis current command value Iq* such that actual rotational speed Nm of motor 100 does not exceed upper rotational speed limit Nmax. The q-axis current command value Iq* is set by performing feedback control based on speed deviation ΔN, in addition to angular deviation D.

Although, in the first and second embodiments, the example in which motor 100 is used as the drive source of electric actuator 23 in VCR mechanism 20 has been described above, the present invention is not limited thereto. Motor 100 may be used as a drive source of various electric actuators in internal combustion engine 10. For example, motor 100 may be used as a drive source of an electric actuator of a variable valve mechanism that makes variable opening and closing timings and lift amounts of intake and exhaust valves in internal combustion engine 10. Therefore, the motor control device according to the present invention may be used to control not only VCR controller 40, but also to control a device for controlling a motor used as a drive source of various electric actuators in internal combustion engine 10. Furthermore, upper rotational speed limit Nmax may change depending on what device the motor 100 is used for.

Although, in the first and second embodiments, d-axis current command value Id* is provisionally determined by referring to the flux weakening amount setting map in d-axis current command value provisional determination process 304, as described above, the present invention is not limited thereto. Alternatively, d-axis current command value Id* may be provisionally determined by various other methods.

REFERENCE SYMBOL LIST

10 Internal combustion engine
12 Piston
20 VCR mechanism
23 Electric actuator
23B Output shaft
40 VCR controller
45, 45A Target current setting unit
100 Motor
Id* d-Axis current command value
Nm Actual rotational speed of motor
Nmax Upper rotational speed limit
ΔN Speed deviation
ΔId Correction amount of d-axis current command value
β Actual angle of output shaft
T Torque generated by internal combustion engine
305, 305A Correcting process for d-axis current command value

The invention claimed is:

1. A motor control device comprising:
a controller that drives a motor provided as a drive source of an electric actuator by performing vector control using d-q rotational coordinates, and that sets a d-axis current command value so as to weaken field flux of the motor when torque is applied to the motor from an exterior in a direction that is equal to a rotation direction of the motor,
wherein the controller corrects the d-axis current command value so as to make a rotational speed of the motor converge to a predetermined upper rotational speed limit when the rotational speed of the motor exceeds the predetermined upper rotational speed limit.

2. The motor control device according to claim 1, wherein the controller corrects the d-axis current command value based on a deviation between the rotational speed of the motor and the predetermined upper rotational speed limit, when the rotational speed of the motor exceeds a predetermined rotational speed.

3. The motor control device according to claim 2, wherein the controller corrects the d-axis current command value so that the d-axis current command value approaches zero as the deviation increases.

4. The motor control device according to claim 1, wherein the predetermined upper rotational speed limit is set based on a time period required for a fail-safe measure executed by the electric actuator when the electric actuator fails.

5. The motor control device according to claim 1, wherein the electric actuator is configured to change a top dead center position of a piston of an internal combustion engine in a variable compression ratio mechanism that adjusts a compression ratio of the internal combustion engine.

6. The motor control device according to claim 1, wherein, even when the rotational speed of the motor exceeds the predetermined upper rotational speed limit, the controller stops correction of the d-axis current command value depending on a state of torque applied to the motor from the exterior in the direction that is the same as the rotation direction of the motor.

7. The motor control device according to claim 1, wherein, even when the rotational speed of the motor exceeds the predetermined upper rotational speed limit, the controller reduces an amount of correction of the d-axis current command value depending on a state of torque applied to the motor from the exterior in the direction that is the same as the rotation direction of the motor.

8. The motor control device according to claim 6, wherein the state of torque is determined based on at least one of an amount of the torque and an actuating position of the electric actuator.

9. The motor control device according to claim 7, wherein the state of torque is determined based on at least one of an amount of the torque and an actuating position of the electric actuator.

10. A motor control method for driving a motor provided as a drive source of an electric actuator by performing vector control using d-q rotational coordinates, comprising:
setting a d-axis current command value so as to weaken field flux of the motor when torque is applied to the motor from an exterior in a direction that is equal to a rotation direction of the motor; and correcting the d-axis current command value so as to make a rotational speed of the motor converge to a predetermined upper rotational speed limit when the rotational speed of the motor exceeds the predetermined upper rotational speed limit.

* * * * *